July 10, 1962 L. L. EISERT 3,043,427
HARVESTING MACHINE
Filed Sept. 19, 1960 2 Sheets-Sheet 1
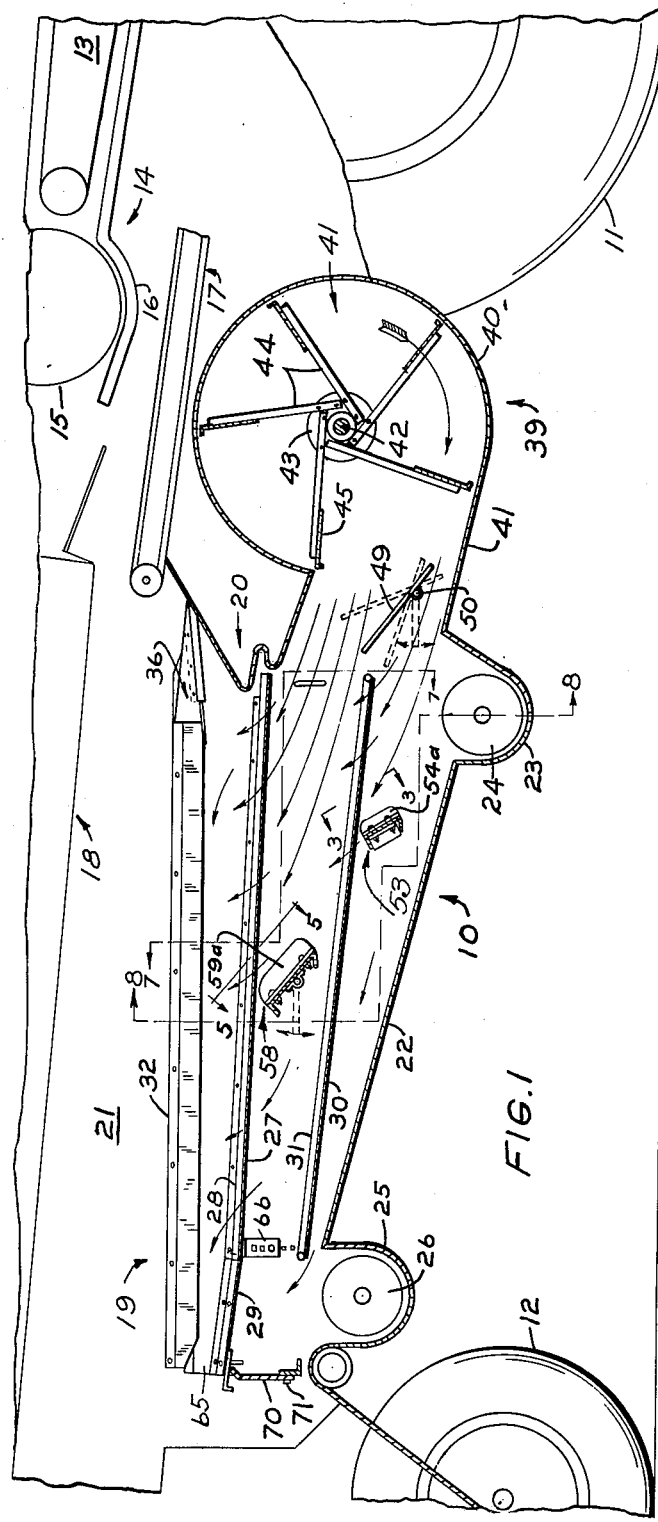
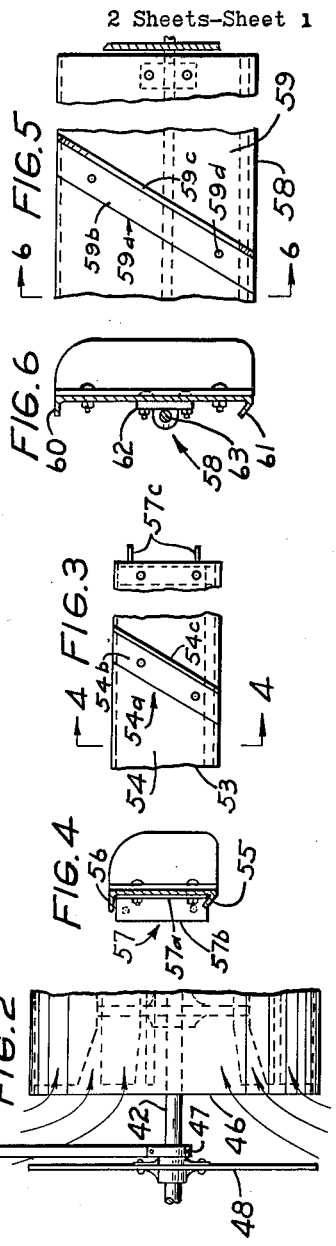
INVENTOR
LLOYD L. EISERT
BY
Williamson + Palmatier
ATTORNEYS

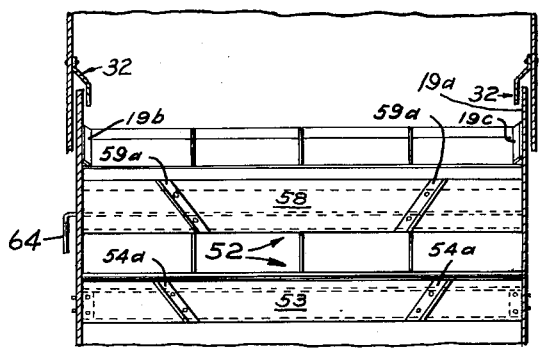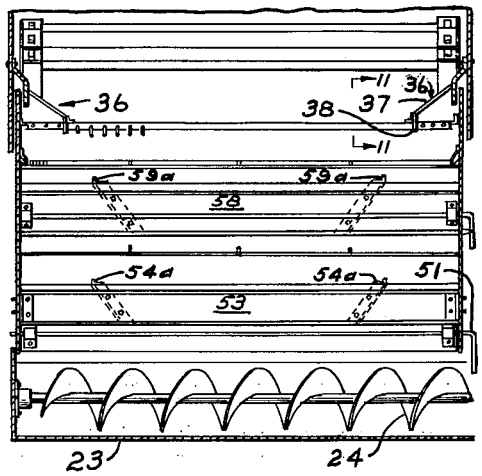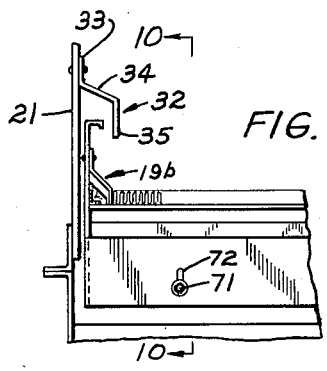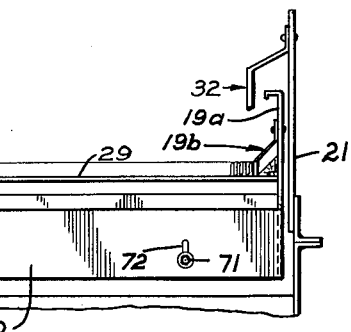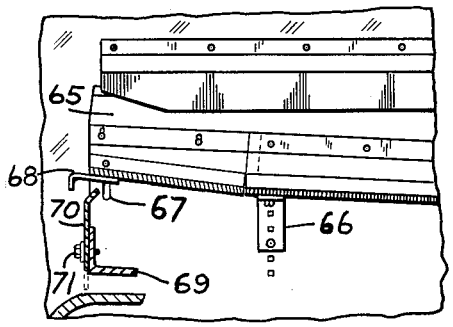
INVENTOR
LLOYD L. EISERT
BY
Williamson + Palmatier
ATTORNEYS United States Patent Office 3,043,427
Patented July 10, 1962

3,043,427
HARVESTING MACHINE
Lloyd L. Eisert, Box 196, Crookston, Minn.
Filed Sept. 19, 1960, Ser. No. 56,810
11 Claims. (Cl. 209—26)

This invention relates to harvesting machines of the type employing air separation means for separating chaff and grain and the like.

One of the long-existing problems associated with harvesting combines is the loss of granular material during the final separation of the chaff from the granular material. In most conventional harvesting machines, this final separation or cleaning of grain or the like from the chaff material which is begun after the threshing operation, is accomplished by depositing the grain and chaff on reciprocating sieves and simultaneously passing a stream of air upwardly through the sieves. Since the chaff is not as heavy as the granular material, the chaff will be entrained in the rearwardly traveling stream of air and the granular material will fall through the sieves and will thereafter be conveyed to a grain receptacle. The air-entrained chaff will then be conveyed rearwardly by the stream of air and will be discharged from the harvesting machine. It is found, however, that chaff and granular material are deposited upon the screen in such amounts that proper aspiration and air entrainment of the chaff in conventional harvesting combines cannot be accomplished for causing the necessary cleaning of the grain and discharge of the chaff material from the machine. Such accumulation of the material upon the chaffer sieve results in large amounts of the granular material, as well as chaff, being conveyed rearwardly by the reciprocating motion imparted to the mass of chaff and grain by the chaffer sieve so that the mass of material is ultimately discharged from the machine. In effect, the chaff cooperates with the reciprocating chaffer sieve to act as a conveyor to cause considerable amounts of granular material to be lost during the separation and cleaning operation. This is especially true if the combine is picking up windrowed crops since a great deal more material will be passed into the machine than is ordinarily handled during straight combining.

It has also been found in most conventional combines that the granular material which passes through the chaffer sieve tends to accumulate upon the forward portion of the grain sieve. This accumulation of grain upon the forward portion of the grain sieve tends to prevent the upward passage of air through the grain sieve so that considerable amounts of the granular material is progressively conveyed rearwardly by the reciprocating motion of this sieve and this rearwardly conveyed grain ultimately falls into the return auger. The return or tailings auger, as is well known in the art, returns the grain to the threshing mechanism and if considerable amounts of this grain is returned to the threshing mechanism, cracking of the grain often occurs. My invention is directed to overcoming these problems.

A general object of this invention is to provide a novel harvesting combine, or inexpensive operation and construction for readily harvesting grain, peas, beans or the like.

Another object of this invention is to provide a novel and improved harvesting combine having vertically spaced apart reciprocating sieves disposed above and rearwardly of a fan mechanism, and an air-flow control mechanism arranged and constructed to cause air produced by the fan mechanism to be upwardly directed through the forward portion of the sieves so that chaff material is entrained within the air stream to permit ready discharge of this chaff material from the rear of the machine.

Another object of this invention is to provide a novel and improved harvesting machine having a pair of reciprocating sieves positioned above and rearwardly of a fan mechanism, and a pair of air-flow control members mounted in flow-controlling relation with respect to the air stream produced by the fan mechanism to cause the air to pass upwardly through the forward portions of the sieve facilitating passage of the grain through the grain sieve and causing the chaff material to be entrained within the air stream for discharge of the chaff rearwardly of the machine in a more efficient manner than any heretofore known comparable harvesting devices.

A still further object of my invention is to provide a novel and improved harvesting machine including reciprocating sieves disposed in cooperating relation with respect to a fan mechanism, the latter having a fan housing having inlets at opposite ends thereof, and a pair of baffle plates disposed in cooperating relation with respect to the fan housing inlets to assure uniform flow of air into the housing even when the fan inlets are subjected to cross winds.

A further object of this invention is to provide a novel and improved harvesting machine, for use in harvesting granular crops, including separator mechanism arranged and constructed to handle a greater amount of material in a more efficient manner than any heretofore known devices, this improved efficient operation of the harvesting machine permitting the machine to be operated at a greater ground speed than was heretofore possible.

Another object of this invention is to provide a novel harvesting machine having reciprocating separator sieves positioned rearwardly and above a fan mechanism a flow control mechanism arranged and constructed to control the direction of flow of air through the sieves, and a valve means associated with the fan mechanism and cooperating with the flow control mechanism to positively direct the flow of air upwardly through the uppermost of the sieves to thereby entrain the chaff material within a rearwardly moving stream of air for discharge of the chaff from the machine.

A still further object of this invention is the provision in a harvesting combine, of the type having a pair of vertically spaced reciprocating sieves and having a fan mechanism for producing a stream of air through said sieves, with a novel flow control attachment arranged and constructed to provide more efficient flow of the air through the sieves in a manner to cause the chaff material to be readily entrained within the air for rearward discharge from the harvesting machine so that the amount of granular material carried by the entrained chaff material will be greatly reduced if not precluded.

These and other objects and advantages of my invention will more fully appear from the following description made in connection with the accompanying drawings wherein like character references refer to the same or similar parts throughout the several views, and in which:

FIG. 1 is a diagrammatic longitudinal section through the separator housing of a harvesting combine incorporating my invention;

FIG. 2 is a fragmentary front elevational view of one end portion of the fan mechanism of the harvesting combine;

FIG. 3 is a plan view of a detail of my invention on an enlarged scale taken approximately along line 3—3 of FIG. 1;

FIG. 4 is a cross-sectional view taken approximately along line 4—4 of FIG. 3 and looking in the direction of the arrows;

FIG. 5 is a plan view of a detail of my invention on an enlarged scale taken approximately along line 5—5 of FIG. 1 and looking in the direction of the arrows;

FIG. 6 is a cross-sectional view taken along line 6—6 of FIG. 5 and looking in the direction of the arrows;

FIG. 7 is a vertical section taken approximately along line 7—7 of FIG. 1 and looking in the direction of the arrows;

FIG. 8 is a vertical section taken approximately along line 8—8 and looking in the direction of the arrows;

FIG. 9 is a fragmentary rear elevational view of a portion of the separator housing;

FIG. 10 is a vertical section taken approximately along line 10—10 and looking in the direction of the arrows; and FIG. 11 is a fragmentary side elevational view of a detail of my invention on an enlarged scale taken along approximately line 11—11 of FIG. 8 and looking in the direction of the arrows.

Referring now to the drawings, it will be seen that a threshing machine such as a harvesting combine, designated by the reference numeral 10, is illustrated in FIG. 1. Although the drawing does not illustrate the complete construction of the harvesting combine 10, it is pointed out that the embodiment illustrated in FIG. 1 is of the self-propelled type although my invention may be used equally well with tow-type combines. The combine 10 is provided with a pair of driven ground-engaging wheels 11 (only one of which is shown) and a pair of ground-engaging wheels 12 (only one being shown). The harvesting combine 10 is of a conventional type and this combine will be provided with means for conveying the cut grain to a threshing machine. This conveyor means is preferably of the center-delivery platform auger type which will be positioned within a housing conveying the cut grain upwardly and rearwardly therefrom. In the event the harvesting operation involves the cutting of standing crops, a swather in the form of a power driven reel and a cutter bar, will be provided for cutting and urging the cut crops rearwardly into the conveyer mechanism. In the event the grain is picked up from previously cut windrows, such a swather attachment will not be necessary as is well known in the art.

The cut grain will then be conveyed to a threshing mechanism by means of a feed-conveyer 13 which will have its forwardmost portions disposed in cooperating relation with the pick-up auger (not shown). This feed auger 13 may be of the saw-tooth slat type which comprises a pair of laterally spaced endless chains trained over a driven and drive sprockets and being interconnected by transversely extending serrated slats. This feed-conveyer 13 positively and evenly feeds the grain to the threshing mechanism 14 comprised of a threshing cylinder 15 which may be of the rasp-bar type and which cooperates with a concave grate 16 during the initial separation of the grain. The threshing cylinder 15 cooperates with the concave grate and a rotary beater (not shown) as is well known in the art to effect ninety percent of the separation of the grain from the straw chaff and other material. Actually ninety percent of the grain will fall through the concave grate 16 or through the grate fingers and upon a second endless feed conveyer 17 whereby the grain and chaff will be conveyed to a separator shoe for final cleaning wherein the weeds, seeds, stems, dirt and chaff are removed from the grain.

It is to be understood that the term granular crops is intended to include soy bean, peas, grass and the like as well as wheat, oats, barley, etc.

It is pointed out that the various conveyer means as well as the threshing cylinder 15 are provided with suitable drive means, and the threshing cylinder may also be provided with a variable speed mechanism for varying the speed thereof. It is also pointed out that the concave grate 16 may be adjusted with respect to its cooperative relation with the threshing cylinder 15 in order to compensate for separation of various kinds of crops and also the varying conditions of a single crop.

Referring again to FIG. 1, it will be seen that the harvesting combine 10 is also provided with a straw-walker mechanism designated by the reference numeral 18 although the specific construction thereof is not illustrated in the instant application. It is the straw-walker mechanism which causes the remaining unseparated grain and straw to become separated because of the agitation or reciprocation of the straw walkers. The grain will be caused to fall from the straw walkers into suitable channels or return pans and this grain will be caused to thereafter fall upon the feed conveyor 17.

The foregoing structure which permits separation of the grain from the straw is old and does not constitute, per se, part of the instant invention. Thus, it will be seen that the separated grain will fall upon the endless feed conveyor 17 which is inclined upwardly and rearwardly and this grain will then be conveyed rearwardly to a separator shoe 19 wherein chaff, weed, seeds, stems and dirt are removed from the grain. This separator shoe 19 is provided with a separator housing 20 which includes a pair of opposed side walls 21 and a lower wall or grain pan 22. The shoe 19 also includes opposed walls 19a, as best seen in FIG. 9, which provide a mounting support for the various elements of the separator. It will be seen that this grain pan 22 is inclined forwardly and downwardly and terminates at its forward end in a clean grain auger housing 23 which is of channel-shape cross sectional configuration. This auger housing 23 houses a clean grain auger 24 which conveys the clean grain to a grain elevator where the grain is thereafter conveyed upwardly to a grain tank. The grain pan 22 terminates rearwardly in a substantially channel-shaped return auger housing 25 which suitably houses a return or tailings auger 26 therein. This tailings auger 26 serves to return grain which falls therein to the threshing cylinder for threshing and return to the separator shoe.

The separator shoe 19 also includes an upper or chaffer sieve 27 which, as seen in FIG. 1, is horizontally disposed and includes a rigid substantially rectangular frame 28 for supporting the adjustable sieve fingers. The sieve is adjustable to vary the openings defined therein so that the sieve may be used for separating chaff from various kinds of crop. Chaffer sieve 27 is provided with a rearwardly projecting extension 29 which is suitably hinged to the sieve 27 and which overlies the tailings auger, also clearly illustrated in FIG. 1. This rearward extension 29 serves to permit the chaff and other material to be conveyed over the tailings auger to minimize the amount of waste material that is to be returned to the separator shoe.

The cleaning shoe also includes a lower or grain sieve 30 disposed below and vertically spaced from the chaffer sieve 27. This grain sieve is also provided with a frame means 31 for support of the adjustable fingers which constitute the foraminous sieve and it is pointed out that this grain sieve is also adjustable to permit use thereof with various kinds of crops. The adjustment of the sieves is such that the opening defined by adjacent fingers may be varied. Although not shown in the drawing, the grain sieve 30 and chaffer sieve 27 will be provided with suitable drive means for simultaneously reciprocating the sieves during the harvesting operation and this agitation serves to facilitate passage of the grain sequentially first through the chaffer sieve 27 and thereafter through the grain sieve to finally fall upon the grain pan 22 or into the clean grain auger. The entire shoe 19 will be driven by a reciprocating mechanism. The grain sieve is inclined forwardly so that the forward end of the sieve is disposed at a lower level than the rear end, and the latter being disposed above and adjacent the tailings auger 26. It will, therefore, be seen that this arrangement minimizes the tendency of the grain which is disposed upon the grain sieve 30 to be conveyed rearwardly into the tailings auger during agitation or reciprocation of the screen.

It will be noted that inasmuch as the grain sieve 30 is forwardly inclined, the spacing between the front of the sieves is greater than the spacing between the rear of the sieves. The spacing between the grain sieve 30 and chaffer sieve 27 is much greater than the spacing between sieves of conventional combines. Actually, this spacing of the sieves is not only accomplished by lowering the grain sieve 30 but the forward portion of the chaffer sieve is also raised.

Means are also provided for reducing the loss of grain that falls from above upon marginal portions of each of the respective sieves. A pair of elongate shield members 32 of angle construction, as best seen in FIGS. 1 and 9 are attached to opposite walls 21 of the separator shoe 19 and each of these shields extends substantially the full length of the separator housing. It will be seen that each of these elongate shields is provided with an upstanding attachment flange 33 attached to its associated side wall 21 by means of bolts or the like. Each shield 33 is provided with an inwardly and downwardly projecting inclined portion 34 terminating in a depending flange 35. It will be noted that these inclined portions and depending flanges 35 of each of the shield members overlie the frame construction of the chaffer sieve 27, as best seen in FIG. 9, to prevent grain loss of grain from falling between the shoe walls 19a and housing walls 21. Thus, it will be seen that these overhanging shields 33 tend to direct grain dropped from above upon the sieve but away from the marginal frame portions thereof.

Guide means are also provided for guiding or funneling the grain when it is discharged from the endless feed conveyer 17 to the shoe housing 20. This guide means includes a pair of guide members or wings 36 which are suitably mounted within the shoe housing at opposite wall portions thereof adjacent the endless feed conveyer 17 as best seen in FIGS. 1, 8 and 11.

Each of these guide members 36 includes an inclined guiding surface which progressively narrows rearwardly, as best seen in FIG. 11, and this guiding surface terminates in a depending flange 38 so that the grain discharged by the endless conveyer 17 will be guided or funneled towards the center of the front portion of the chaffer sieve 27.

Another feature of my invention includes a pair of grain deflectors 19b attached to opposite walls 19a of the shoe 19. Each of these deflectors includes an inwardly inclined deflecting surface which overlies the frame of the chaffer sieve and causes grain to be deflected inwardly away from the frame elements. Grain falling on the frames will rest thereupon and will be conveyed rearwardly and not pass through the sieve. The deflectors 19b prevent the accumulation of grain on the sieve frames and thereby reduce the loss of grain.

A fan mechanism 39 is also provided for producing a stream of air directed against the front portions of both the grain or chaffer sieves during reciprocation of these sieves so that the chaff and waste material will become air-entrained and will be discharged from the rear of the shoe while the grain will fall through the sieves into the grain auger or the grain pan 22. This fan mechanism 39 includes a substantially elongate cylindrical fan housing 40 having a rearwardly and upwardly extending tangential discharge 41 which is arranged in communicating relation with the separator housing 20. The fan mechanism also includes a rotary bladed fan 41 for rotation with the housing and this fan 41 includes an elongate shaft 42 having a plurality of hubs 43 mounted at axially spaced points therealong and these hubs are each provided with a plurality of radially extending spokes or spiders 44. Each of the spokes 44, as best seen in FIG. 1, are connected to and support a fan blade or paddle 45, each of these blades extending substantially the entire length of the housing 40. Rotation of the rotary bladed fan 41 produces an upwardly and rearwardly directed air stream and the drive means for the fan includes a variable speed mechanism for varying the speed of rotation of the fan.

In most conventional harvesting combines, the fan housing 40 will have its opposite ends open, which openings define the air inlets for the fan housing. Ordinarily, these inlets are covered by a perforate screen or the like in some machines which are intended to keep weeds, straw and the like from entering the fan but which oftentimes become matted with such material thus interfering with proper supply of air to the housing. Referring now to FIG. 2, it will be seen that the housing 40 has open ends 46 (only one of which is shown) which defines the inlet thereof and the shaft 42 projects outwardly through these open ends and is supported by bearings 47 suitably supported from the combine frame and each of these bearings 47 has a substantially disc-shaped baffle plate 48 connected thereto. It will be noted that the baffle plate 48 is spaced axially from the open end of the housing 46 and is preferably of the same size and shape as the cross sectional shape of the housing and is formed of imperforate material such as metal or the like. With this arrangement, the air is introduced into the housing 40 through marginal portions only of the inlet. These baffle members 48 also serve to insure constant and even generation or production of the air stream by the fan mechanism even when the ends of the fan housing 40 are subjected to cross winds. Actually, cross winds pass through the ends of the housing in conventional harvesting combines and into the separator housing. When these cross winds are of sufficient velocity, the wind blasts interfere with the air stream produced by the rotary bladed fan. It will be seen that provision of the baffle plates not only serves to shield the housing against the entry of foreign material therein but also serves to eliminate any effect of cross winds upon the fan mechanism and thereby insures even and constant distribution of air into the fan housing.

Means are also provided for controlling the amount of air passing through the tangential discharge 41 of the fan housing 40 and this means includes a valve member 49 in the form of a substantially elongate flat plate which traverses substantially the entire width of the discharge 41. This valve member 49 is mounted on the pivot 50, the latter being suitably journalled in opposite walls of the discharge outlet 41 for rotation relative thereto. A suitable actuating handle 51 may project from one end of the pivot rod 50 to the outside to permit ready pivoting and adjustment of the valve member 49. The various positions of the valve member are indicated in dotted line configuration and it will be seen that this valve member not only controls the amount of air discharged towards the chaffer sieve 27 but is also adjustable to control the amount of air directed to the space below the grain sieve 30.

As previously pointed out, in most conventional combines most of the chaff and grain will be fed from the endless apron conveyer 17 upon the forward portion of the chaffer sieve 27, and when the harvesting operation involves the picking up of windrows then the amount of material which passes through the threshing mechanism in a given time is much greater than the amount of material which passes into a combine during straight combining. Therefore, the amount of chaff and grain deposited on a chaffer sieve is of sufficient quantity in conventional combines to prevent the passage of air upwardly through the fingers of the chaffer sieve. The air strikes the lower surface of the sieve and because of the accumulated mass will be deflected rearwardly and pass beneath the sieve. The behaviour of the air streams striking the grain sieve is also somewhat similar since most of the grain accumulates at the forward portion of the grain sieve 30 so the air will also strike the under surface of the sieve and be directed thereafter rearwardly. Because of the agitation of the chaffer and grain sieves the chaff will be progressively moved rearwardly and deposited upon the ground and this rearwardly moving mass of chaff also has considerable amounts of grain embedded therein and of course a great deal of grain will be lost through the discharge of the chaff rearwardly of the separate shoe housings. Also, in most conventional combines the grain sieve tends to cause a considerable amount of the grain to be discharged rearwardly of the grain sieve into the tailings or return auger 26. Although this grain material will be again conveyed to the threshing cylinder to be returned to the separator shoe 19, it is undesirable to have quantities of grain rethreshed. This is so because this grain is oftentimes cracked during a subsequent threshing operation which results in a great deal of spoilage of the grain. In order to provide effective aspiration and suspension of the chaff material above the chaffer sieve 27 or rearward discharge of this chaff material as well as to insure cleaning of the lower grain sieve, I have provided a directional flow control mechanism designated in its entirety by the reference numeral 52.

This directional flow control mechanism 52 cooperates with the fan mechanism and the valve element 49 to control the direction of flow of the air stream produced by the fan mechanism upwardly through the forward terminal portions of both the chaffer and grain sieves where such air distribution is needed most. This directional flow control mechanism 52 includes an elongate lower flow control member 53 which is disposed slightly rearwardly of and below the front terminal portion of the grain sieve 30. This flow control member 53 is of substantially channel shape cross sectional configuration and includes a web or air directing surface 54 and a front flange 55 and a rearwardly depending flange 56. It will be noted that this control member 53, as best seen in FIGS. 7 and 8, is of elongate shape and is mounted at its opposite ends to the side walls 21 of the shoe housing 20. It will be noted that the flow control member 53 is mounted so that the air-directing surface 54 is disposed in angulated forwardly-inclined relation with respect to the general plane of the grain sieve 30, and it will be seen that this air-directing surface 54 has a leading edge disposed in substantially co-planar relation with the bottom wall of the tangential discharge 41. The front flange of the flow members 53 is disposed at approximately 45 degrees with respect to the air-directing surface 54 to permit the passage of some of the air below this member although as best seen in FIG. 1, most of the air passing below the valve element 49 will be directed through the forward portion of the grain sieve 30.

The means for mounting the flow control member 53 to opposed side walls 21 of the shoe housing 20 comprises a pair of angle brackets 57 which are each mounted at opposite ends of the control member 53, as best seen in FIGS. 3, 4 and 8. Each of these angle brackets is provided with a flange 57a which is suitably connected to the web or air-directing surface 54 by means of bolts or the like. Each bracket 57 is also provided with a flange 57b having a pair of studs 57c projecting therefrom. These studs will be passed through suitable apertures in the side walls 21 of the shoe housing to suitably mount the control member in controlling relation with respect to the air stream directed towards the front portion of the grain sieve.

The directional flow control mechanism 52 also includes an upper flow control member 58 which is also of elongate channel construction and includes an air directing surface 59, front flange 60 and a depending rear flange 61. It will be noted, however, that the air directing surface 59 is substantially wider than the air directing surface 54 of control member 53 and this upper flow control member is mounted for pivoting movement about its longitudinal axis relative to the side walls 21. Actually, the underside of the air directing surface 59 is provided with a pair of small brackets or bearings 62 suitably secured thereto by means of bolts or the like and these brackets constitute means for connecting the flow-control members 58 to the elongate pivot rods 63, the latter extending through suitable apertures formed in the side walls 21 of the shoe housing 20. One end of the pivot rod 63 projects from one of the side walls 21 to define a handle 64 for facilitating adjustment of the flow control member 58. It will be noted that the flow control member 58 is disposed between the grain sieve 30 and chaffer sieve 27 and slightly rearwardly of the lower flow control member 53. Normally, the flow control member 58 will be adjusted so that the air directing surface 59 thereof is disposed in forwardly inclined angulated relation with respect to the general plane of the upper or chaffer sieve 27, as illustrated in FIG. 1.

In order to provide even distribution of the air throughout the entire area of the front portions of the grain sieve 30 and chaffer sieve 27, I have provided each of the flow control members with additional air distribution means. This air distribution means for the lower flow control member includes a pair of deflecting elements or vanes 54a as best seen in FIGS. 3 and 8. It will be seen that these deflector elements 54a are of angle construction and each includes a flange 54b which is secured to the air-directing surface and each deflector also includes an upstanding flange 54c which is disposed substantially normal to the plane of the air directing surface 54. It will be noted that these deflector elements 54a are arranged adjacent the ends of the flow control member and are disposed in rearwardly diverging relation with respect to each other so that the air generated by the fan mechanism and passed upwardly through the grain sieve 30 will also be directed through marginal portion of the grain sieve 11. This air distribution means also includes a pair of deflecting elements or vanes 59a for the upper flow control member 58, clearly illustrated in FIGS. 5 to 8. It will be seen that these deflector elements 59a are also of angle construction and each includes a flange 59b which is secured to the air directing surface 59 and each deflector also includes an upstanding flange 59c which is disposed substantially normal to the plane of the air-directing surface 59. It will be noted that these deflector elements 59a are arranged adjacent the ends of the control member 58 and are disposed in rearward diverging relation with respect to each other so that the air generated by the fan mechanism and passed upwardly through the grain sieve will not only be directed upwardly through the chaffer sieve 27 but also be directed positively to the marginal portion of the chaffer sieve thus insuring that all of the chaff material adjacent the front and side portions of the sieve will be suspended above the sieve by the air stream.

The separator shoe housing 20 also includes a rearwardly facing outlet 65 through which the air entrained chaff material will be discharged. It will be noted that the rear terminal portion of the chaffer sieve will be supported by brackets 66 adjustably attached to the side walls 21 to permit the rear end of the chaffer sieve to be vertically adjusted. The rear end of the extension 29 is also vertically adjustable, this extension being provided with laterally extending bolts or the like engageable within a slot 69 formed in each of the side walls 21. A rearwardly-projecting and grasping member 68 is attached to the screen and facilitates adjustment of the rear end thereof, as best seen in FIGS. 1 and 10.

The rear discharge outlet of the shoe housing 20 is also provided with a damming member 70 which is vertically adjustable. This damming member 70 is in the form of a substantially flat, vertical plate as best seen in FIGS. 9 and 10 and is secured to an angle member 69 by means of bolts 71 which pass through appropriate slots 72 formed in the damming member. The slots 72 are vertically arranged to permit the damming member to be vertically adjusted. Referring now to FIG. 10, it will be seen that the dotted line position illustrates an adjusted position of the damming member for closing off a portion of the opening defined below the angle 69.

In operation, the cut crop will be conveyed up to the threshing cylinder for separation thereat. As pointed out above, if the harvesting machine is used for straight combining, a swather will be attached and if the crop has been previously cut and windrowed, the swather will not be necessary. After separation at the threshing cylinder wherein most of the separation of the grain and straw takes place, the grain will fall upon the endless feed conveyor 17 and be conveyed upon the chaffer sieve 27. Some grain will be discharged upon the endless speed conveyor 17 from the straw walker grain pans or channels and will ultimately be discharged upon the chaffer sieve 27. The material deposited upon chaffer sieve will include in addition to grain, weeds, chaff, dirt and other debris and this grain and material will tend to accumulate at the front portion of the chaffer sieve. The valve element 49 may be adjusted to the position indicated by full line configuration of FIG. 1 and most of the air produced by the rotary fan mechanism 39 will be directed upwardly to the space defined between the sieves. Some of the air, however, will be discharged through the tangential discharge 41 below the valve element 49 and the greater portion of this air stream will be directed upwardly through the forward portion of the grain sieve 30 by the lower flow control member 53. The air which is directed upwardly through the lower portion of grain sieve 30 will commingle with the air stream produced above by the valve element 49 as indicated by the arrows in FIG. 1. The combined air streams will be caused to pass upwardly through the forward portion of the sieve 27 by the upper flow control member 58. The deflecting elements 59a are arranged in cooperating relation with the air directing surface 59 for complete, even distribution of this air over the entire area of this forward portion of the sieve. It is at this precise point where most of the air is needed to effect sufficient and complete separation of the chaff from the grain. Since the chaff is lighter in weight than the grain, this chaff will be aspirated or suspended in the stream of air which will be thereafter directed rearwardly above the sieve for causing discharge of the chaff rearwardly from the separator housing. The air passing through the forward portion of the grain sieve will completely clean and cause passage of the grain through the sieve into the grain pan below. If it is found that some of the grain is being conveyed rearwardly over the end of the grain sieve 30 into the tailings auger 26, it may be necessary then to adjust the valve element 49 so that some of the air directed to the area below the grain sieve 30 may be lessened. This is accomplished by rotating the valve element 49 so that the valve element is moved to a more vertically disposed position as indicated by one of the dotted line positions in FIG. 1. This tendency of the shoe mechanism to convey too much of the grain into the tailings auger which is a condition which may be checked by examining the material conveyed by the tailings auger, has been found to be attributable in some instances to too much air pressure being exerted on undersurface of the grain sieve 30. Therefore, by diminishing the amount of air discharged into the space below the grain sieve 30, this condition may be corrected. Grain falling through the sieve 30, of course, will be caused to move into the clean grain auger 23 to be conveyed to an elevator and thereafter into a grain tank.

In the event it is desirable to cause the air entrained chaff material to be discharged in an arcuate fashion this can be accomplished by adjustment of the valve element 49 and the upper flow control marker 58 to a more shallow inclined position so that the air will be directed through the chaffer sieve 27 through a greater portion thereof while the straight discharge effect may be accomplished by moving the flow control member 58 and the valve element 49 to the full line positions indicated in FIG. 1. It will be seen that the upper flow control member 58 is adjustable about its longitudinal axis to permit control of the direction of flow of the air through the sieve 27 so that the mechanism is readily usable for separation of various kinds of crops.

The baffle members 48 insure that the air stream produced by the fan will be constant and uniform so that the reciprocating sieves are not subjected to blasts of air. Since the lower wall of the tangential discharge 41 is disposed in substantially co-planar relation with the leading edge of the lower flow control member 53 the natural direction of the flow of air will be upwardly through the forward portion of the grain sieves so that most of the grain which accumulates at this forward portion will be readily made to fall therethrough.

The most noticeable improved result of the flow control mechanism and valve element of my invention is that almost any make and model of conventional combines employing my device will be able to handle more material in a more efficient manner so that the yield is very noticeably improved. It should also be pointed out that the spacing and disposition of the chaffer and grain sieves also results in a better and improved distribution of the air so that better and efficient cleaning takes place. In some instances the improved yield, which is obtained by obviating the loss of grain material during the harvesting operation, has been greater than 25 percent. It has been found that combines employing my invention may also be operated at a much faster speed. This improved result is possible because the air flow directional control mechanism permits a more efficient handling of greater amounts of material by the combine. Since the air completely suspends the chaff material, very little if any grain material is entrained in the air and that which is carried out by the chaff has been found to be granular material which would not be usable even if it was saved.

It has also been found that the unique manner in which the grain sieve 30 is positioned with respect to flow control mechanism results in very little if any grain material being discharged into the tailings auger since most of the clean grain will be discharged into the clean grain auger. Therefore, the loss incurred through cracking of the grain is substantially reduced. One of the problems associated with harvesting of oats has been the harvesting and discharge of wild oats back into the harvested field. This results in recurrence of these undesirable wild oats in the planted field. It has also been found that through the use of my invention substantial amount of the wild oats harvested during the harvesting of domestic grain will be separated out into the grain tank so that these wild oats will not be discharged out into the field again. Previously known obstacles such as sow sickles are easily entrained in the discharge air stream, which result is directly attributable to the manner in which my invention functions when incorporated within a conventional harvesting machine.

It will, therefore, be seen from the preceding paragraphs that I have provided a novel harvesting machine which not only functions in a more efficient manner whereby greater crop yields are obtained but my harvesting machine also operates at greater speed than conventional harvesters thus effecting both a great saving in crops as well as time. It will be noted from the above paragraphs that harvesting machines employing my invention may be operated at a much faster ground traversing speed even when the harvesting operation involves harvesting windrowed crops. It will also be seen from the foregoing description that I have provided a harvesting machine which not only effectively cleans and separates ordinary chaff, dirt and the like from granular material but also readily separates and effectively discharges waste material such as sow thistle which in conventional combines previously could not be effectively separated and which material interfered with the cleaning operation of conventional harvesting devices.

It will also be seen from the foregoing description that I have provided an attachment readily adaptable for use with any conventional threshing machine such as a harvesting combine without necessitating making an alteration of the structure of the combine.

It will, of course, be understood that various changes may be made in the form, details, arrangement and proportions of the various parts without departing from the scope of my invention.

What I claim is:

1. In combination with a harvesting machine having a pair of vertically spaced, generally horizontal, reciprocating sieves and having a fan mechanism mounted forwardly and below the sieves for discharging an air stream upwardly through the latter for air separation and discharge of chaff from granular crops, a directional air-flow control mechanism for controlling the direction of flow of the air through the reciprocating sieves and including a pair of elongate air-flow control members each mounted transversely of said sieves and each having front and rear peripheral edges, one of said air-flow control members being disposed below and rearwardly of the front terminal portion of the lowermost of said sieves and the other of said members being disposed between said sieves and having its front peripheral edge spaced rearwardly of the rear peripheral edge of said one member, and each of said members having an air-directing surface cooperating with said fan mechanisms for directing the air stream produced by the latter upwardly and rearwardly through said sieves to cause the chaff to be entrained within said air stream for rearward discharge thereby.

2. In combination with a harvesting machine having a pair of vertically spaced, generally horizontal, reciprocating sieves and having a fan mechanism mounted forwardly and below the sieves for discharging an air stream therewithin upwardly through the latter for air separation and discharge of chaff from granular crops, a directional air-flow control mechanism for controlling the direction of flow of the air through the reciprocating sieves and including a pair of elongate air-flow control members each mounted transversely of said sieves and each having front and rear peripheral edges, one of said air-flow control members being disposed below and rearwardly of the front terminal portion of the lowermost of said sieves and the other of said members being disposed between said sieves and having its front peripheral edge spaced rearwardly of the rear peripheral edge of said one member, and each of said members having an air-directing surface for directing the air stream upwardly and rearwardly therefrom and each having deflecting elements disposed in cooperating relation with its associated air-directing surface for simultaneously deflecting portions of the air stream through lateral marginal portions of the sieves disposed thereabove whereby chaff material disposed on said sieves will be entrained within said air stream for rearward discharge thereby.

3. The structure as defined in claim 2 wherein the air-directing surfaces of said air-flow control members are disposed in angulated relation with respect to said sieves and wherein the uppermost of said members is adjustable to permit the angulated relation between said last mentioned member and its associated sieve to be varied.

4. A threshing machine such as a harvesting combine for separating chaff and straw from granular type crops, said machine comprising a separator housing, a pair of vertically-spaced, generally horizontally disposed sieves mounted within said housing for reciprocating movement relative thereto, a fan mechanism including an elongate fan housing disposed transversely and forwardly of said separator housing and having a rotary fan mounted for rotation therein, said fan housing having a rearwardly extending tangential discharge communicating with said separator housing for discharging a stream of air rearwardly through said separator housing, an air-flow directional control mechanism for controlling the direction of flow of the air through said reciprocating sieves and including a pair of elongate air-flow members each mounted transversely of said sieves and each having front and rear peripheral edges, one of said air-flow control members being disposed below and rearwardly of the front terminal portion of the lowermost of said sieves and the other of said members being disposed both between said sieves and having its front peripheral edge spaced rearwardly of the rear peripheral edge of said one member, each of said flow control members having an air-directing surface disposed in angulated relation with respect to the sieve disposed thereabove for directing the air stream upwardly and rearwardly therefrom and a valve element adjustably mounted within said fan housing discharge in flow controlling relation with the air stream produced by said fan and cooperating with said flow control members for directing the air stream upwardly through the forward portions of the sieves to entrain chaff material within the air stream for rearward discharge thereby and simultaneously facilitating the passage of granular material through the sieves.

5. The structure as defined in claim 4, wherein the other of said air flow control members is adjustably mounted on said separator housing for adjusting the angulated relation of the air directing surface of said last mentioned control member with respect to the sieve disposed thereabove.

6. The structure as defined in claim 4 wherein the other air-flow control members is provided with deflector elements mounted in upstanding relation on the air-directing surface associated therewith and cooperating with the latter causing portions of the air stream to be deflected upwardly through marginal portions of the uppermost of said sieves.

7. The structure as defined in claim 4 wherein opposite ends of said fan housing are open to define air inlets thereat, and a pair of imperforate baffle plates, each being mounted closely adjacent and in opposed relation with one of said inlets and each of said baffle plates having a shape and size corresponding to the shape and size of its associated inlet to cause air to be introduced into said fan housing through marginal portions only of said inlets.

8. The structure as defined in claim 4 and a pair of downwardly converging guide elements attached to opposite walls of said separator housing above the forward portion of the uppermost of said sieves for causing granular crops and chaff to be funneled centrally of said last-mentioned sieve.

9. A harvesting combine for separating chaff and straw from granular type crops and including a separator housing having rearwardly disposed outlet, a pair of vertically spaced, transversely extending sieves shiftably mounted within said housing for reciprocating movement relative thereto, the uppermost of said sieves being disposed generally horizontally and the lowermost of said sieves being forwardly inclined, a fan mechanism including an elongate housing disposed transversely and forwardly of said separator housing and having a rotary fan rotatably mounted within said housing, said fan housing having a rearwardly extending tangential discharge communicating with said separator housing for discharging a stream of air rearwardly and upwardly through said separator housing, a pair of elongate air-flow control members each having front and rear peripheral edges and each extending transversely of said housing and one of which is disposed below but spaced slightly rearwardly of the front terminal portion of the lowermost sieve, the other of said air-flow control members being disposed between said sieves and having its front peripheral edge spaced rearwardly, the rear peripheral edge of said one member, each of said air-flow control members having a substantially flat forwardly inclined air-directing surface for directing the stream of air produced by said fan mechanism upwardly and rearwardly through the forwardmost portions of said sieves, and a pair of rearwardly diverging vanes mounted in upstanding relation on the other of said air-flow control members for simultaneously deflecting portions of said air stream towards lateral marginal portions of the uppermost of said sieves, and a valve element adjustably mounted within said fan housing discharge in flow controlling relation with the air stream produced by said fan and cooperating with said flow control members for directing the air stream upwardly through the forward portions of the sieves to entrain chaff material within the air stream for rearward discharge thereby and simultaneously facilitating the passage of granular material through the sieves.

10. An air-flow control attachment for harvesting combines of the type having a pair of vertically-spaced, generally horizontally disposed, reciprocating sieves and having a fan mechanism mounted forwardly of and below the sieves for discharging an air stream rearwardly and upwardly through the latter for air separation and discharge of chaff from granular crops, said air-flow control attachment including a pair of elongate air-flow control members each being adapted to be mounted on said combine and tranversely of said sieves and each having front and rear peripheral edges, one of said members being disposed forwardly of and below the forward portion of the lowermost of said sieves, the other of said air-flow control members being disposed between said sieves and having its front peripheral edge spaced rearwardly the rear peripheral edge of said one member, each of said flow-control members having a substantially flat air-directing surface disposed in forwardly inclined relation when said attachment is mounted on a combine and being disposed in cooperating relation with said fan mechanism for directing the air streams produced by the latter upwardly and rearwardly through said sieves to cause chaff to be entrained within said air stream for rearward discharge thereby.

11. The structure as defined in claim 10 wherein the other of said air-flow control members includes means for adjustment thereof relative to the sieve disposed thereabove when said member is mounted on a combine to permit said inclined air-directing surface to be varied with respect to the sieve disposed thereabove.

References Cited in the file of this patent
UNITED STATES PATENTS

| | | |
|---|---|---|
| 236,340 | Krake | Jan. 4, 1881 |
| 402,462 | Laufenburg | Apr. 30, 1889 |
| 1,198,863 | Marschel | Sept. 19, 1916 |
| 1,922,986 | Stith | Aug. 15, 1933 |
| 2,143,100 | Anderson | Jan. 10, 1939 |
| 2,849,118 | Ashton | Aug. 20, 1958 |
| 2,954,123 | Gaunt | Sept. 27, 1960 |